(12) United States Patent
Fridrici et al.

(10) Patent No.: US 7,909,380 B2
(45) Date of Patent: Mar. 22, 2011

(54) SKIP FOR GRANULAR MATERIALS

(75) Inventors: Vincent Fridrici, Ecully (FR); Damien Dussud, Civrieux d'Azergues (FR); Jérôme Guillemenet, Dijon (FR); Jean-Christophe Abry, Thurins (FR); Gérard Meille, Sathonay Village (FR)

(73) Assignee: Alcan Rhenalu, Paris (FR)

( * ) Notice: Subject to any disclaimer, the term of this patent is extended or adjusted under 35 U.S.C. 154(b) by 1028 days.

(21) Appl. No.: 11/575,508

(22) PCT Filed: Sep. 27, 2005

(86) PCT No.: PCT/FR2005/002388
§ 371 (c)(1),
(2), (4) Date: Mar. 19, 2007

(87) PCT Pub. No.: WO2006/035155
PCT Pub. Date: Apr. 6, 2006

(65) Prior Publication Data
US 2007/0216196 A1 Sep. 20, 2007

(30) Foreign Application Priority Data
Sep. 28, 2004 (FR) .................................... 04 10241

(51) Int. Cl.
*B60P 1/28* (2006.01)
*B60R 13/01* (2006.01)
(52) U.S. Cl. .................... 296/41; 296/183.2; 298/1 R
(58) Field of Classification Search ............... 296/39.1, 296/39.2, 41, 183.2; 298/1 R, 1 B
See application file for complete search history.

(56) References Cited

U.S. PATENT DOCUMENTS

| 971,028 | A | * | 9/1910 | Eskildsen | 296/41 |
| 3,363,933 | A | * | 1/1968 | Wilson | 296/183.2 |
| 3,480,321 | A | * | 11/1969 | Brandt et al. | 296/183.1 |
| 3,617,090 | A | | 11/1971 | Huffman | |
| 3,652,123 | A | * | 3/1972 | Speers | 296/183.1 |
| 3,912,325 | A | * | 10/1975 | Sudyk | 296/39.2 |
| 4,019,781 | A | | 4/1977 | Ray | |
| 4,116,485 | A | * | 9/1978 | Svensson | 296/39.1 |
| 4,333,678 | A | * | 6/1982 | Munoz et al. | 296/39.2 |
| 4,474,404 | A | * | 10/1984 | Hagenbuch | 296/182.1 |
| 4,802,705 | A | * | 2/1989 | Elwell | 296/39.2 |
| 5,597,194 | A | * | 1/1997 | Daugherty et al. | 296/39.2 |
| 5,803,531 | A | * | 9/1998 | Nielsen | 296/184.1 |

(Continued)

FOREIGN PATENT DOCUMENTS

DE 29706241 U1 * 5/1997

(Continued)

OTHER PUBLICATIONS

Stealth Dump Trucks, Inc. "Pick-up Truck Dump Bed Kits" Nov. 1, 2009, pp. 1-9.

*Primary Examiner* — Glenn Dayoan
*Assistant Examiner* — Paul A Chenevert
(74) *Attorney, Agent, or Firm* — Dennison, Schultz & MacDonald

(57) ABSTRACT

A skip for the transport, storage and handling of granular materials (such as sand, gravel and earth) including a base and lateral walls. At least part of the base is a sheet of metal that has been imprinted with one or more relief patterns on one face thereof, with the sheet being disposed such that the pattern is in contact with the granular material during the transport or unloading of the granular material.

28 Claims, 2 Drawing Sheets

(a)      (b)

(c)      (d)

(e)      (f)

U.S. PATENT DOCUMENTS

| | | | |
|---|---|---|---|
| 5,851,043 A | 12/1998 | Moutrey et al. | |
| 5,988,723 A * | 11/1999 | Adkins | 296/39.2 |
| 6,000,741 A * | 12/1999 | Reynolds et al. | 296/39.2 |
| 6,007,132 A | 12/1999 | Burg et al. | |
| 6,129,409 A | 10/2000 | D'Amico | |
| 6,174,014 B1 * | 1/2001 | Hook et al. | 296/39.2 |
| 6,305,731 B1 * | 10/2001 | Hook et al. | 296/39.2 |
| 6,854,808 B2 * | 2/2005 | Kostecki | 298/7 |
| 7,059,647 B1 * | 6/2006 | Sierakowski et al. | 296/39.1 |
| 2003/0218360 A1 | 11/2003 | Henderson et al. | |
| 2005/0225159 A1 | 10/2005 | Thorvaldson, Sr. | |

FOREIGN PATENT DOCUMENTS

| | | |
|---|---|---|
| GB | 924802 | 5/1963 |
| GB | 2312693 A * | 11/1997 |
| GB | 2381009 | 4/2003 |
| JP | 59202103 | 11/1984 |
| WO | 0166301 | 9/2001 |

* cited by examiner

SKIP FOR GRANULAR MATERIALS

FIELD OF THE INVENTION

This invention relates to a skip for granular materials, which has improved abrasion resistance.

DESCRIPTION OF RELATED ART

A skip for granular materials most often comprises a base 1, typically a flat or curved base, and a plurality of lateral walls 4 intended to confine the granular material being transported; a skip typically has a rectangular shape and comprises two pairs of lateral walls 2, at least one of which can be opened in order to unload the granular material by tilting the skip by a lift mechanism 3 (see FIG. 1). Another method of construction is the so-called "half-moon" shape comprising a curved base and lateral walls, of which the one that can be opened to unload the granular material can have a relatively complex curved shape. Other skip shapes exist, in particular those that enable unloading through the base. In addition to the base and walls, these skips can comprise exterior stiffeners or frames. The portions of the walls and base that come into contact with the granular material are usually smooth, so that the granular material slides well when being unloaded.

Skips for granular materials are typically unloaded by dumping: the skip is tilted and the granular material flows out via an opening. This opening can be a lateral flap door. The outflow can also occur via an opening in the base of the skip. In any event, the granular material slides over the base of the skip during this outflow. That leads to abrasive wear. This wearing of the base of the skip is greater near the opening through which the skip is unloaded, because the pressure and the exposure time are greater there. The wear depends on the material used for the base of the skip and on the granular material. It also depends on the tilting speed of the skip, as well as on the rheologic characteristics of the granular material. These rheologic characteristics can depend, for example, on the moisture content: it is known that dry sand flows out as the skip is raised whereas wet sand, which is more susceptible to compaction, flows out in several blocks that become detached from the principal mass. Here, the term "granular material" encompasses any granular material, regardless of its origin and its nature, whether inorganic or organic, which is usually transported in skips, such as: sand, gravel, pebbles, stones, topsoil, earth fill, grains and cereals, etc.

The flow conditions encountered on skips lead to significant wearing of the base of the skips. Several remedies have been proposed for steel skips. The base of the skip can be covered with a sheet or strip of rubber. Use has also been made of sheets that are more resistant to abrasion, e.g., made of HARDOX® 400 or 450. It is also possible to optimise the geometry of the skip so as to minimise the pressure that the granular material exerts on the surfaces of the skip; the dumper-type skip is an example of one such geometry.

U.S. Pat. No. 6,007,132 (Caterpillar) discloses a liner element ensuring abrasion protection of the skip of a machine such as an off-road vehicle. This liner element comprises a plate having openings and raised cladding strips made of an abrasion-resistant material. These openings and these strips make it possible to roll the load rather than to slide it, which, combined with the thickness of the plate and with the abrasion resistance of the material used for the cladding, makes it possible to reduce abrasion of the body. The material used for producing the raised cladding strips preferably contains chromium carbide. The cladding strips have a preferred thickness of 10 mm.

Patents also exist which disclose skip bases, generally for light lorries of the "pick-up truck" type, wherein the skip is not of the tilting type.

WO 01 66301 (Pullman Industries) discloses a skip element comprising roll-formed ribs having a generally parallel orientation with respect to said skip element. This element is typically a "corrugated sheet." The end of these ribs is pressed so as to produce a progressive taper making it possible to connect these ribs to the flat ends of the skip.

US 2003 218360 (Anderson) also discloses skip elements used in "pick-up trucks," comprising a "corrugated sheet" obtained by roll-forming. These corrugated sheets have a raised pattern on both faces and are difficult to connect to the other elements of the skip.

The solutions described above are costly and require a complex design and a manufacturing operation made difficult by the number of components to be assembled. Furthermore, it would be desirable to have abrasion-resistant skips that can be made of an aluminium alloy since, at equivalent performance levels, they are lighter than steel skips.

Finally, relief printing on sheet metal is known.

GB 2 381 009 (Cooper Clarke Group) discloses non-slip surfaces including raised patterns designed in particular not to limit abrasion, but to prevent shoes from slipping.

SUMMARY OF THE INVENTION

The purpose of this invention is to propose a new abrasion-resistant skip for granular materials, having an economical and simplified design, which can be constructed of an aluminum alloy.

The object of the invention is a skip for transporting, storing or handling granular material, comprising a base and lateral walls, characterised in that at least one portion of the base comprises in particular a sheet having been impressed with one or more raised patterns on a single face, said sheet being arranged so that said pattern is in contact with said granular material during the transport or unloading of the granular material.

DISCLOSURE OF THE INVENTION

Figure 1:
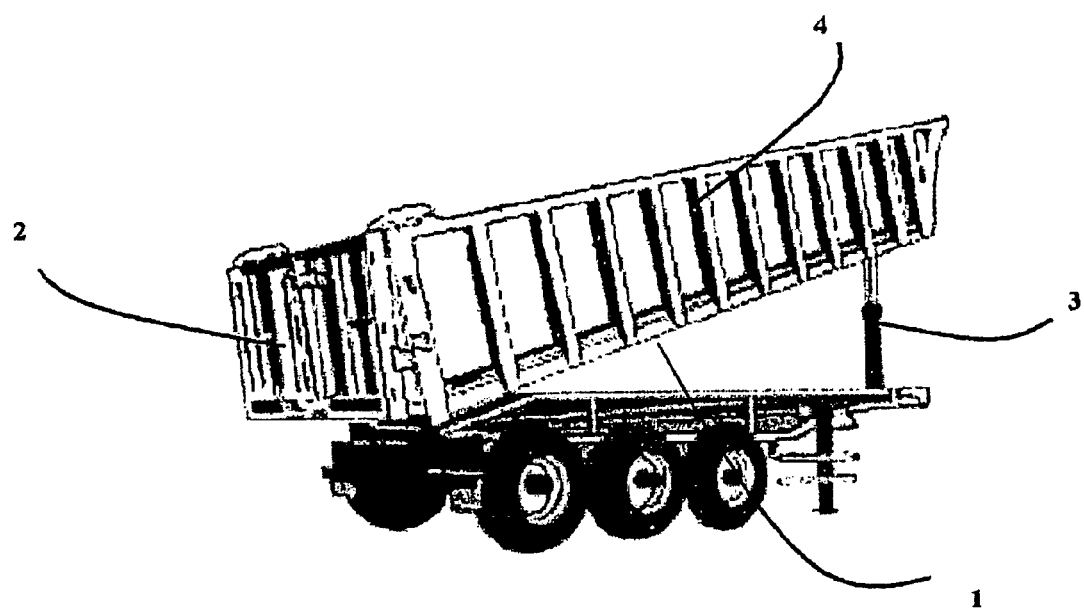
FIG. 1 shows a skip according to the prior art produced from sheets and structural shapes made of various aluminium alloys.

During studies conducted in preparation for this invention, the applicant realised that the improvement in the wear resistance of the base of aluminium skips, by means of developing alloys more resistant to abrasion, was rather small.

The inventor then had the idea that improved control of the flow of the granular material during unloading might enable significant gains: instead of increasing the wear resistance of the base of the skip, the flow conditions are modified so as to reduce the wear that a given material undergoes with respect to a skip according to the prior art. The solution that was found departs from trends in skip construction: instead of reducing the friction between the base of the skip and the granular material (by choosing a smooth base over which the granular material "slides well," or by choosing a very rough base so as to cause the granular material to "roll"), this friction is prevented by choosing a base that retains a layer of granular material when it is dumped.

This invention is based on the established fact that, when a skip is raised, the major portion of the granular material flows out, not directly by sliding over the base of the skip, but over a stationary layer of granular material on the base of the skip. Consequently, the wearing of the base of the skip is caused by the sliding of the last layer, i.e., the layer of granular material that is actually in contact with the base of the skip. The wearing of the base of the skip, which is associated with the force brought about by the last layer, will be lower to the extent that this last layer is of a small thickness. Thus, it can be reduced by any means which ensures that, during sliding of this last layer, the force that acts on the surface of the base of the skip is as weak as possible. A means making it possible to retain a layer of granular material, so that friction occurs between the layers of granular material, the layer of granular material retained by the rough base being ultimately dumped out and not causing any abrasion by reason of its small thickness, thus makes it possible to reduce the wearing of the base of the skip.

According to the invention, one such means, for example, is the use of a tread plate on the base of the skip. According to the standard EN 12258-1, to those skilled in the art, it is understood that "tread plate" means a "patterned sheet upon which a raised pattern has been impressed on one side by rolling." "corrugated sheet" means a "roll-formed sheet of symmetric or asymmetric profile," "patterned sheet or tread plate" means a "sheet on which a raised or indented pattern has been impressed or embossed on either one or both faces," and "embossed finish" means "a pattern mechanically impressed on a surface by rolling or pressure." The sheet impressed with one or more raised patterns according to the invention, in which the pattern generally has a maximum height of a few millimeters, differs from a roll-formed "corrugated sheet" in which the corrugation can be much larger, in which the ribs are parallel to the direction of rolling and which is corrugated in a symmetrical or asymmetrical fashion on both faces. The pattern of the tread plate, of the tread plate, and of the embossed finish is most often a repeating pattern that runs the entire length and the entire width of the sheet. Tread plates, patterned or tread plates and embossed-finish sheets are used advantageously within the scope of the invention. Tread plates are particularly advantageous. Tread plates are known per se and have been the object of a European Standard EN 1386. These plates are always engraved on a single face.

According to the invention, said sheet or plate having been impressed with one or more raised patterns is arranged at the base of the skip, so that the embossment is in contact with the granular material when the skip is loaded. Within the scope of this invention, the term "base" must be understood as signifying the portion of the skip on which the granular material exerts a downwardly directed force (when the skip is in horizontal position i.e. a travelling position), while the term "wall" must be understood as signifying the portion of the skip on which the granular material exerts a somewhat horizontal force. The base and the walls can be separate parts (e.g., assembled by welding or bolting), or represent a single curved shape (assembled or not). What is important is that at least a portion of the base of the skip, namely the portion over which the granular material slides when it is unloaded, is covered with or consists of a sheet having been impressed with one or more raised patterns. The "lower" portion and the "upper" portion of the skip are differentiated, the lower portion being the lowest when the skip is tilted (close to the flap door through which the granular material is unloaded), and the upper portion being the highest when the skip is tilted (opposite the flap door). According to the invention, the sheet having been impressed with one or more raised patterns can be arranged over the entire surface of the base of the skip, or only over the lower portion. Said sheet preferably constitutes or covers at least the lower third of the skip. The technical effect is greater if said sheet constitutes or covers at least the lower half of the skip.

According to the invention, the embossment must be chosen such that it retains the last layer of granular material when the skip is tilted in order to be unloaded. For illustrative purposes, an embossment comprising a plurality of elongated lines, substantially linear or not, is most suitable. A portion of said elongated lines are advantageously oriented at approximately 90° or more in relation to the other portion of said elongated lines.

Such patterns are known by the standard designations "Check 2," "Check 5," "Diamond," "Barley Corn," "Almond," as well as by other designations such as "Rice Grain," "Diamonds," "Fir-cone," "Check 3" (derived from the Check 2 with three parallel lines instead of 2), "Check 4" (derived from the Check 5 with 4 parallel lines instead of 5). All of these designations describe the shape of the pattern succinctly and figuratively. The check-type sheets are also called D2, D3, D4, D5, according to the number of parallel lines that form the pattern. For illustrative purposes, a pattern that suits the embodiment of this invention is the one described in French Patent FR 2 747 948 (Pechiney Rhenalu).

Figure 2:
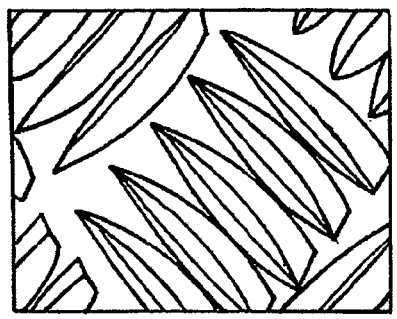
FIG. 2 shows various patterns for tread plates usable within the scope of this invention: (a) Check 5 (abbreviated as D5), (b) Check 2 (abbreviated as D2), (c) Rice Grain, (d) Diamond, (e) Barley Corn, and (f) Almond.
Figure 2:
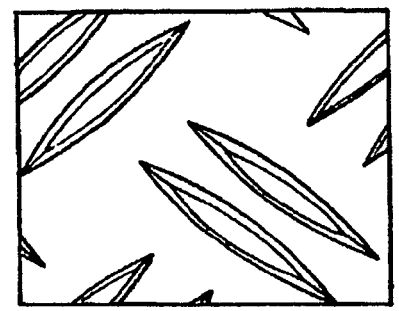
Figure 2:
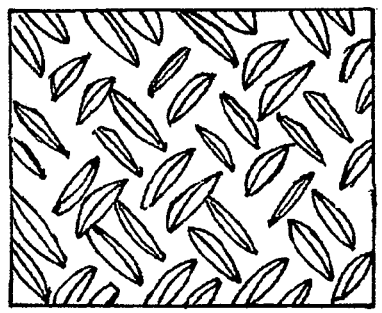
Figure 2:
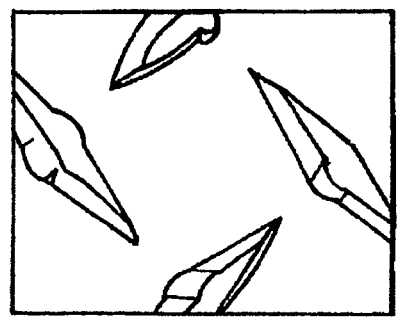
Figure 2:
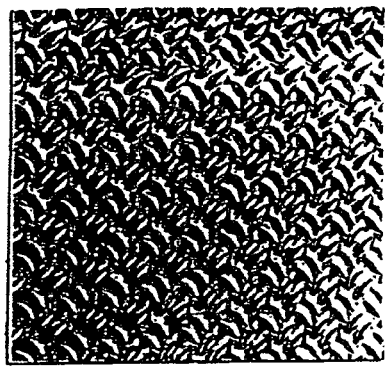
Figure 2:
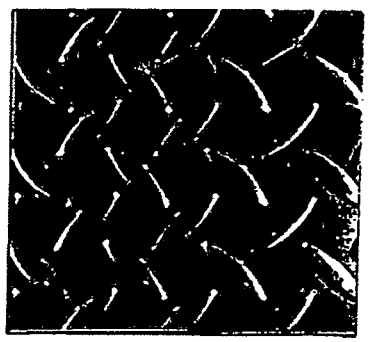

Within the scope of this invention, it is preferable to arrange the sheet so that the lines are oriented at approximately 45° in relation to the direction of flow of the granular material when it is being unloaded (referred to here as "direction of flow"). It is also possible to use tread plates the pattern of which consists of studs having a more or less circular shape (when seen from above). FIG. 2 shows four patterns preferred within the scope of this invention. The length of the lines can range between approximately 0.5 cm and approximately 15 cm.

One of the advantages of this invention is that the solution, namely the use of tread plates at the base of the skip, is based on the use of standard, commercially available products made from alloys very similar to those used in the construction of industrial vehicles, and the working of which (such as cutting, folding, welding) does not pose any particular or unusual problem. Thus, this solution does not bring about any significant additional cost. These alloys used for tread plates can be made of steel or, preferably an aluminium alloy, such as an alloy of the 5xxx series. Copper-free 7xxx series alloys of the Al—Zn—Mg type, such as 7020, and alloys of the 6xxx series, such as 6061, are likewise suitable. The skip according to the invention can be produced so that said impressed sheet constitutes or covers the entire surface of the base of the skip, or only a portion of said base over which the granular material slides when being unloaded. This portion can be situated close to the opening through which the granular material slides when being unloaded from the skip.

The abrasion of the base of the skip is yet further reduced if the average grain size of the transported or stored granular material does not exceed the height of the pattern. Furthermore, the advantage of the invention is clearer with wet sand than with dry sand, as shown in Example 2.

According to one embodiment of the invention, the base of the skip consists of a sheet having been impressed with one or more raised patterns. According to another embodiment, said impressed sheet covers the base of the skip, which can be manufactured from a smooth sheet based on aluminium or other materials such as steel.

In the following examples, advantageous embodiments of the invention are described for illustrative purposes. These examples are non-limitative.

EXAMPLES

Example 1

In this test, the dumping of sand from a skip made to 1/20 scale was explored. The skip consists of a rectangular Plexiglas box whose base consists of an aluminium sheet. It is mounted on a test stand making it possible to tilt the skip using a motorised hydraulic jack. For the base, the sheet is chosen for which one wishes to study the influence on the flow conditions of the sand. This base sheet has a length of 60 cm and a width of 25 cm. As in a real skip, the lateral wall through which the sand flows out can be opened by tilting under the pressure of the sand. The total weight of the sand ranges between 25 and 30 kg. The test is carried out in the following way: the sand is loaded, the skip is gradually tilted at a constant speed, while the sand dumping sequence is recording with a video camera so that, at each moment, the angle of the skip ($\alpha$) and the thickness of the layer of sand can be measured, with the aid of graduated rules placed on the walls. Measured in particular are the starting angle of flow and the thickness of the layer of sand at that moment, as well as the angle (also called repose angle) and the thickness of the layer of sand at the moment when the layer of sand in direct contact with the base of the skip begins to slide.

Two types of sand were used, fine sand with an average diameter of the order of 0.5 mm, and coarse sand with an average diameter of the order of 1.7 mm. In addition, gravel having a grain size of 5 to 20 mm was tested.

The tests were carried out with five different made of an aluminium alloy. A smooth plate served as a calibration for the results. Four different patterns were tested, Rice Grain, Check 2 (D2), Check 5 (D5) and Diamond, with two different pattern orientations (45° and 90°) in relation to the flow of sand. These patterns are differentiated by their shape and their geometry. The D5 patterns cover less surface area on the plate than those of Rice Grain, but are higher (2 mm for D5, 0.5 mm for Rice Grain). Table 1 shows the value of the repose angle (slip angle) of the last layer in contact (21 cm from the flap door through which the sand is dumped).

TABLE 1

Repose angle of the last layer, 21 cm from the flap door

| | | | Type of base | | | | |
|---|---|---|---|---|---|---|---|
| | | | | Sheet | | Rice Grain | |
| | | D2 | Diamond | D5 | | Sheet | |
| | | | Orientation of the rough protuberances | | | | |
| | Smooth sheet | 45° | 45° | 45° | 90° | 45° | 90° |
| Average obtained with coarse sand (dry) | 25.3 | 32.75 | 30.89 | 31.75 | 31.25 | 31.75 | 30.50 |
| Standard deviation produced from 2 tests | 0.45 | 0.29 | 0.29 | 0.29 | 0.50 | 0.50 | 0.41 |

TABLE 1-continued

Repose angle of the last layer, 21 cm from the flap door

| | | | Type of base | | | | |
|---|---|---|---|---|---|---|---|
| | | | | Sheet | | Rice Grain | |
| | | D2 | Diamond | D5 | | Sheet | |
| | | | Orientation of the rough protuberances | | | | |
| | Smooth sheet | 45° | 45° | 45° | 90° | 45° | 90° |
| Average obtained with fine sand (dry) | 28.00 | 36.83 | 35.50 | 36.83 | 36.33 | 36.38 | 35.00 |
| Standard deviation produced from 2 tests | 0.87 | 0.29 | 0.50 | 0.29 | 0.29 | 0.48 | 0.50 |
| Average obtained with the gravel | 23.75 | 32.63 | 32.33 | 33.00 | — | 32.25 | — |
| Standard deviation produced from 2 tests | 0.50 | 0.63 | 0.29 | 0.50 | — | 0.29 | — |

The excellent reproducibility (standard deviation less than 2%) is noted: two tests reproduced under the same conditions yield the same result within a range of approximately 0.5°. It is observed that gravel slides over smooth sheets, but rolls over tread plates. The same tests are carried out with a lifting speed two times higher or lower, and that does not affect the result.

Table 2 shows the thickness of sand of the last layer before it slides. It is observed that the use of a tread plate as the base of the skip results in a reduction of this layer (a reduction of between 55% and 75% for coarse sand, and between 65% and 85% for fine sand).

TABLE 2

Thickness of sand (in cm) of the last layer prior to sliding, 21 cm from the flap door

| | | Type of base | | | |
|---|---|---|---|---|---|
| | | D5 Sheet | | Rice Grain Sheet | |
| | | Orientation of the rough protuberances | | | |
| | Smooth sheet | 45° | 90° | 45° | 90° |
| Average obtained with coarse sand (dry) | 2.04 | 0.50 | 0.67 | 0.75 | 0.92 |
| Standard deviation produced from 2 tests | 0.39 | 0.00 | 0.14 | 0.00 | 0.14 |
| Average obtained with fine sand (dry) | 1.75 | 0.50 | 0.50 | 0.25 | 0.58 |
| Standard deviation produced from 2 tests | 0.43 | 0.00 | 0.00 | 0.00 | 0.14 |

The thickness h of sand remaining during sliding of the last layer and the repose angle $\alpha$ of the last layer make it possible to calculate the normal pressure $F_n$ on the base of the skip, according to the formula $F_n = \rho\, g\, h \cos \alpha$, where g has the value of 9.81 N.m$^{-1}$ and p is the mass density of the sand (2650 kg m$^{-3}$). Table 3 shows the result of these calculations.

TABLE 3

Normal pressure as the last layer starts to slide [Nm$^{-2}$]
and reduction of this force with respect to a smooth
sheet [%]

| | Type of base | | | |
|---|---|---|---|---|
| | Smooth sheet | D5 Sheet | | Rice Grain sheet |
| | | Orientation of the patterns (rough protuberances) | | |
| | | 45° | 90° | 45° | 90° |
| Normal force, average obtained with coarse sand (dry) | 50 Nm$^{-2}$ | 11.5 Nm$^{-2}$ | 15.5 Nm$^{-2}$ | 17.5 Nm$^{-2}$ | 21.5 Nm$^{-2}$ |
| Reduction with respect to a smooth sheet | — | 77% | 69% | 65% | 57% |
| Normal force, average obtained with fine sand (dry) | 50 Nm$^{-2}$ | 13 Nm$^{-2}$ | 13 Nm$^{-2}$ | 6.5 Nm$^{-2}$ | 15.5 Nm$^{-2}$ |
| Reduction with respect to a smooth sheet | — | 74% | 74% | 87% | 69% |

As the normal pressure $F_n$ during friction governs the wear parameters of the base of the skip, it is obvious that, for dry sand, the service life of the base of the skip is longer if a skip base made of tread plate metal is used. The orientation of the patterns in relation to the direction of flow makes it possible to somewhat further reduce the normal forces and therefore the wear. Thus, for the D5 and Rice Grain sheets, a 45° orientation is preferred to a 90° orientation.

The comparison between the results obtained with the D5 sheet and the Rice Grain sheet reveal a correlation between the flow conditions and the ratio between the average grain diameter of the granular material and the height of the pattern. If the average diameter of the grains is similar or larger than the height of the patterns, the normal forces on the base are greater than in the case where the grains are smaller than the height of the pattern. Table 4 shows the complementary results obtained with a D5 sheet under the same conditions as those that produced the results of Table 1, except that for one of the sheets, the pattern was ground down in order to reduce its height by 2 to 0.5 mm. It is observed that, for coarse sand, the repose angle does not depend on the height of the pattern, as long as this height does not significantly exceed the average grain size, whereas when the average grain size of the sand is less than the height of the pattern, the repose angle increases along with the height of the pattern.

TABLE 4

Repose angle of the last layer, 21 cm from the flap door

| Type of base | D5 Sheet | D5 Sheet |
|---|---|---|
| Orientation of the rough protuberances | 90° | 90° |
| Height of the patterns | 2 mm | 0.5 mm |
| Average obtained with coarse sand (dry) | 31.25° | 31° |
| Standard deviation produced from 2 tests | 0.50 | 0.41 |
| Average obtained with fine sand (dry) | 36.33° | 34.9° |
| Standard deviation produced from 2 tests | 0.29 | 0.42 |

Example 2

In this example, the test of Example 1 was repeated with compacted wet sand. Compaction has only a very small effect on the dry sand. In contrast, it turned out that compaction was an essential parameter for the tests with wet sand. The cohesive forces between the grains, due to capillary attraction, are very significant and bring about a great deal of variance in the results. These results are summarised in Table 5. Although varied, these results are clear. In addition, it is observed that, in a skip with a smooth base, sand becomes detached from the talus (end of the pile of sand on the flap door side) in several slabs, whereas in a skip with a base made of an tread plate, this phased detachment occurs while leaving a stationary layer on the base of the skip. This stationary layer becomes detached only at the end of dumping and considerably reduces the abrasion of the base of the skip.

The more compacted the wet sand is, the greater the repose angle of the last layer. The effect of the tread plate on the base of the skip is even more significant for wet sand than for dry sand: the detachment in slabs limits the normal forces even more than a continuous flow observed with dry sand. Furthermore, the use of wet sand is closer to the actual conditions of use for a skip in cement factories and quarries.

TABLE 5

Repose angle of the last layer, 21 cm from the flap door

| | Type of base | | | |
|---|---|---|---|---|
| | Smooth sheet | D5 Sheet | | Rice Grain Sheet |
| | | Orientation of the rough protuberances | | |
| | | 45° | 90° | 45° | 90° |
| Average obtained with coarse sand (wet) | 32 | 50.5 | 59.8 | 52.8 | 53.6 |
| Standard deviation | 6.25 | 10.7 | 19.7 | 11.1 | 14.7 |
| Average obtained with fine sand (wet) | 37 | 52.3 | 60.5 | 53.1 | 56.7 |
| Standard deviation | 6.8 | 10.9 | 18.8 | 10.7 | 12 |

Example 3

In this example, a study was made of the effect of the use of a D5-type embossed sheet orientated at 45° in relation to the flow of the granular material, for one portion only of the base of the skip, the other portion of said base being made from a smooth sheet.

The sand used is the so-called coarse sand defined in Example 1. It was used in the dry state. Five skip base configurations were tested: a smooth sheet, an engraved sheet, a sheet of which the lower ⅔ are smooth and the upper ⅓ is engraved, a sheet of which the lower ⅓ is engraved and the upper ⅔ are smooth, a sheet of which the lower ⅔ are engraved and the upper ⅓ is smooth. The composite configurations, i.e., comprising smooth sheets and engraved sheets, are made from separate sections placed end-to-end.

The tests are carried out and interpreted in the same way as in the preceding examples. The results obtained are reported in Table 6.

TABLE 6

Repose angle of the last layer, 21 cm from the flap door

| | Sheet | | | | |
|---|---|---|---|---|---|
| | Smooth | Engraved | Lower ⅔ smooth Upper ⅓ engraved | Lower ⅓ engraved upper ⅔ smooth | Lower ⅔ engraved upper ⅓ smooth |
| Repose angle of the last layer, 21 cm from the flap door | 24.9 | 34.9 | 27.1 | 31.2 | 34.9 |
| Standard deviation | 0.4 | 0.2 | 0.2 | 0.6 | 0.2 |

The results clearly show that even a partial covering of the base of the skip alters the flow conditions of the granular material appreciably. Thus, covering of the lower ⅔ with an engraved sheet makes it possible to obtain results identical to those obtained with a complete covering. Covering the lower ⅓ with the engraved sheet significantly alters the repose angle without altering the thickness of the remaining sand. In this case, the sand descending from the smooth upper portion remains stuck on the engraved sheet. Finally, covering the lower ⅓ with engraved sheet metal has a slight effect but it is insignificant.

The invention claimed is:

1. Skip for transporting, storing or handling granular material, comprising a base and lateral walls, one of said lateral walls being openable, and the skip being constructed and arranged to be carried by a vehicle and to be tiltable upwardly with respect to the vehicle to enable removal of the granular material by gravity through the openable lateral wall,
   wherein at least a portion of the base comprises a sheet impressed with at least one raised pattern on a single face thereof, the at least one pattern having a length of between 0.5 and 15 cm, said sheet being arranged so that during the transport or during the unloading of the granular material, said pattern is in contact with said granular material,
   wherein the at least one pattern retains a layer of stationary granular material in contact therewith during removal of the granular material by gravity, and
   wherein the at least one raised pattern is at least one of:
   a) a pattern selected from the group consisting of patterns known by standard designations of Check 2, Check 5, Barley Corn, Diamond, Almond, and Rice Grain,
   b) a pattern comprising elongated lines, which lines are oriented at approximately 45° in relation to direction of flow of the granular material while being unloaded from the skip via tilting of the skip and sliding of the granular material through an opening provided in the base, and,
   c) a pattern comprising elongated lines, which lines are oriented at approximately 45° in relation to direction of flow of the granular material while being unloaded from the skip via tilting of the skip and sliding of the granular material through an opening provided in one of the lateral walls.

2. Skip according to claim 1, wherein said pattern is a repeating pattern.

3. Skip according to claim 1, wherein said sheet is a tread plate impressed via rolling.

4. Skip according to claim 1, wherein said sheet is an embossed sheet.

5. Skip as claimed in claim 1, wherein said sheet is an embossed-finish sheet having a pattern which has been impressed via pressure or rolling.

6. Skip according to claim 1, wherein the entire surface of said base of the skip comprises said sheet.

7. Skip according to claim 1, wherein only a portion of the surface of said base over which the granular material slides when being unloaded comprises said sheet.

8. Skip according to claim 7, wherein the portion of the surface of said base that comprises said sheet is at least the lower ⅓ situated close to the opening through which the granular material slides when being unloaded from the skip via tilting.

9. Skip according to claim 1, wherein said sheet is made of steel or an aluminum alloy.

10. Skip according to claim 9, wherein said sheet is made of aluminum alloy of the 5xxx series.

11. Skip according to claim 9, wherein said sheet is made of a copper-free, Al—Zn—Mg alloy of the 7xxx series.

12. Skip according to claim 9, wherein the alloy is a 7020 alloy.

13. Skip according to claim 9, wherein said sheet is made of a 6xxx series aluminum alloy.

14. Skip according to claim 13, wherein said sheet is made of a 6061 alloy.

15. Skip for transporting, storing or handling granular material, comprising a base of predetermined length and lateral walls, one of said lateral walls being openable,
   wherein the base, over at least a portion of the length thereof, consists of a sheet impressed with at least one raised pattern on a single face thereof, the at least one pattern having a length of between 0.5 and 15 cm, said sheet being arranged so that during the transport or during the unloading of the granular material, said pattern is in contact with said granular material, and
   wherein the at least one raised pattern is at least one of:
   a) a pattern selected from the group consisting of patterns known by standard designations of Check 2, Check 5, Barley Corn, Diamond, Almond, and Rice Grain,
   b) a pattern comprising elongated lines, which lines are oriented at approximately 45° in relation to direction of flow of the granular material while being unloaded from the skip via tilting of the skip and sliding of the granular material through an opening provided in the base, and,
   c) a pattern comprising elongated lines, which lines are oriented at approximately 45° in relation to direction of flow of the granular material while being unloaded from the skip via tilting of the skip and sliding of the granular material through an opening provided in one of the lateral walls.

16. Skip according to claim 15, wherein said pattern is a repeating pattern.

17. Skip according to claim 15, wherein said sheet is a tread plate impressed via rolling.

18. Skip according to claim 15, wherein said sheet is an embossed sheet.

19. Skip as claimed in claim 15, wherein said sheet is an embossed-finish sheet having a pattern which has been impressed via pressure or rolling.

20. Skip according to claim 15, wherein the entire surface of said base of the skip consists of said sheet.

21. Skip according to claim 15, wherein only a portion of the surface of said base over which the granular material slides when being unloaded consists of said sheet.

22. Skip according to claim 21, wherein the portion of the surface of said base that consists of said sheet is at least the lower ⅓ situated close to the opening through which the granular material slides when being unloaded from the skip via tilting.

23. Skip according to claim 15, wherein said sheet is made of steel or an aluminum alloy.

24. Skip according to claim 23, wherein said sheet is made of aluminum alloy of the 5xxx series.

25. Skip according to claim 23, wherein said sheet is made of a copper-free, Al—Zn—Mg alloy of the 7xxx series.

26. Skip according to claim 23, wherein the alloy is a 7020 alloy.

27. Skip according to claim 23, wherein said sheet is made of a 6xxx series aluminum alloy.

28. Skip according to claim 27, wherein said sheet is made of a 6061 alloy.

* * * * *